UNITED STATES PATENT OFFICE.

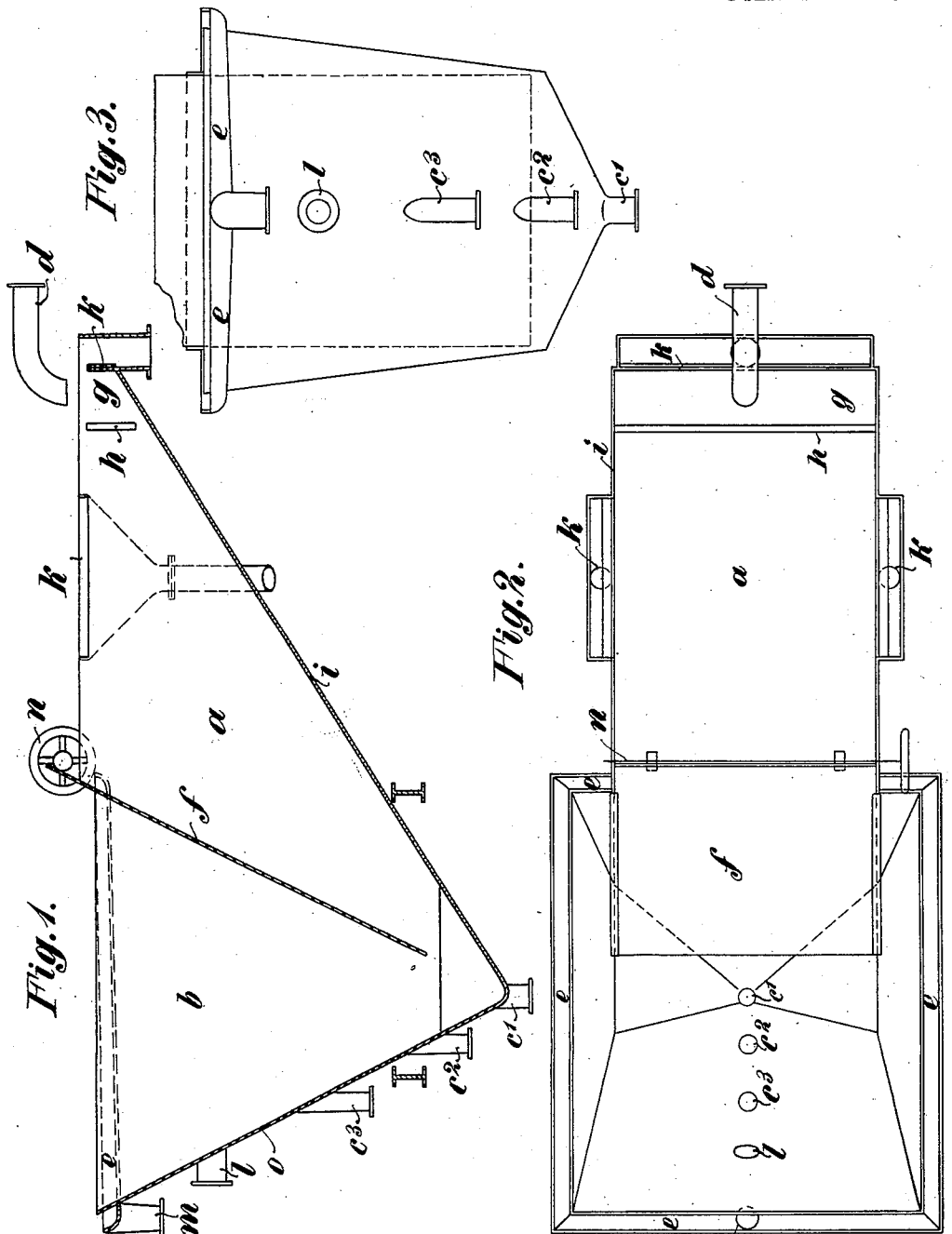

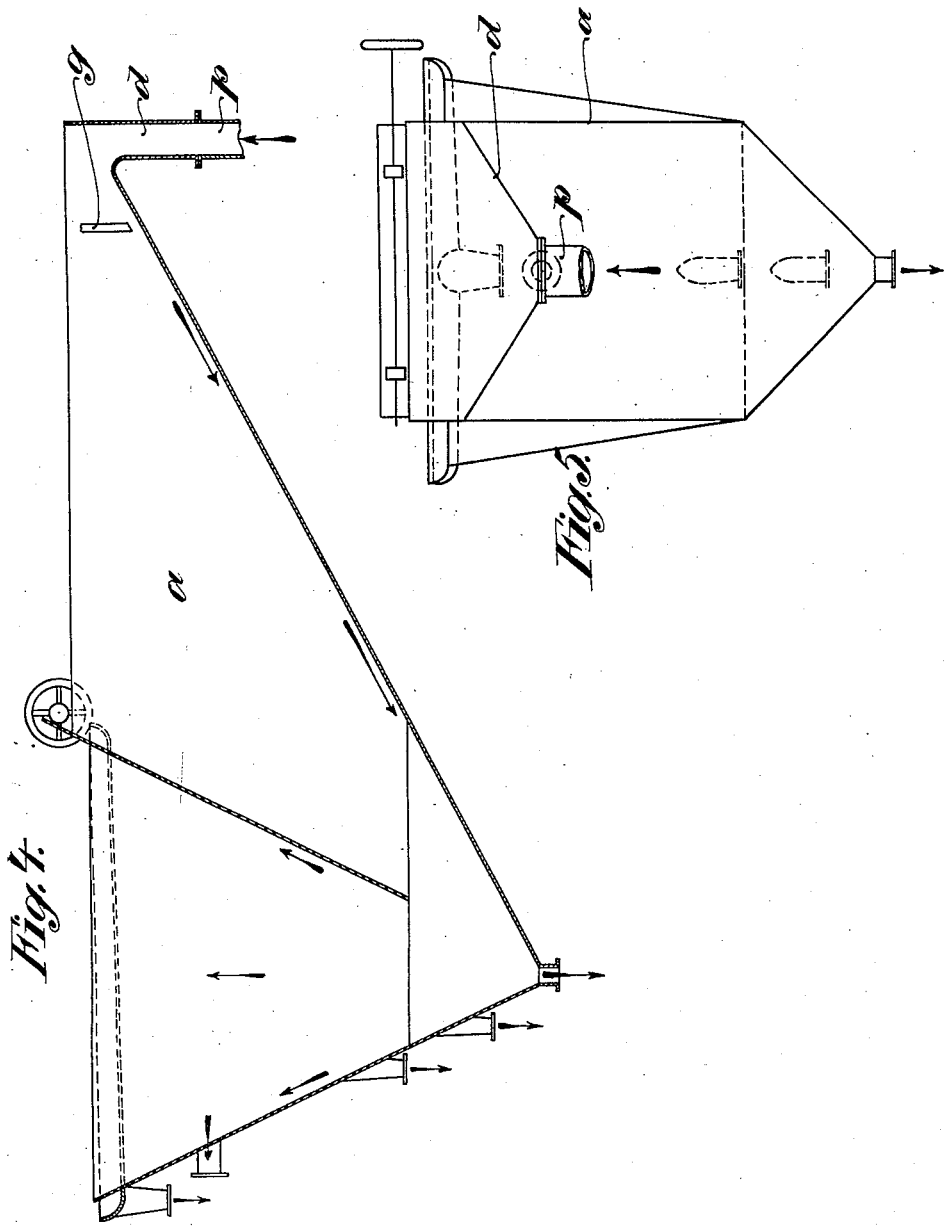

EDUARD MANN AND JACOB HEESS, OF EBERTSHEIM, GERMANY.

APPARATUS FOR PURIFYING WASTE WATER.

1,095,409.  Specification of Letters Patent.  Patented May 5, 1914.

Application filed November 6, 1913. Serial No. 799,554.

*To all whom it may concern:*

Be it known that we, EDUARD MANN and JACOB HEESS, subjects of the King of Bavaria, and resident at Ebertsheim, Palatinate of the Rhine, German Empire, have invented certain new and useful Apparatus for Purifying Waste Water, of which the following is a specification.

The invention relates to an apparatus of the nature of a screening apparatus for purifying and cleaning the outfall water in paper and cellulose works for the purpose of recovering the paper material and other ingredients still contained in the water (filaments, china-clay, glue, color, etc.); it may also find application in similar industries, for instance, for the removal of the impurities from drinking water and other liquids. The new apparatus is so constructed that it meets the various requirements for purifying these mixtures, and consequently secures a complete separation of the materials which can be used over again and of the impurities from the residual water and thus a complete clarification of the water is obtained.

The drawing illustrates the new apparatus; Figure 1, being a longitudinal section. Fig. 2 is a plan view. Fig. 3 is a front elevation. Fig. 4, is a slightly modified form of the device, in side elevation, and Fig. 5 is an end view of the form shown in Fig. 4.

The new apparatus is composed according to this invention of two receptacles $a$ and $b$ placed in connection one with the other at the lower part, through which the liquid to be treated flows successively. The first receptacle $a$ for the liquid in which the impurities sink and separate into light and heavy mixtures, (for which reason the receptacle is described as the precipitating receptacle) possesses a considerable length and a front wall $i$ sloping gently toward the partition, while a rear wall $f$ sloping toward the inlet $d$ is so arranged that the flocculent particles rising upward after they are combined together are deposited upon the surface $i$ and unite with the particles which have sunk to the bottom by their own gravity, while the air and the fatty bodies with other light impurities rise to the surface. The precipitated materials can be removed in the well known manner from the deepest part of the receptacle, while the liquid rises underneath the lower end of the partition $f$ into the second receptacle $b$, which receptacle widens out upward in the form of a funnel. The clarified water can be removed from the top of this second receptacle $b$, known as the rising or clarifying receptacle, and at about the middle height thereof according to requirement, special taps may be inserted for the removal of the partially clarified liquid. For the precipitation of the materials contained in the liquid, there may also, as far as necessary, be used any of the well known precipitants (sulfate of alumina, alum, raw sulfate, and so forth) which, however, in the present instance are mixed with the waters before their entry into the receptacle and also in the suction pump well.

The waste waters proceeding from the paper machine flow through the tube $d$ at $g$ into the receptacle $a$. By means of the slide-plate $h$, adjustable in the vertical direction, there is separated off beneath the inflow $d$ in the space $a$ a front chamber $g$ which may be regarded as a settling and distributing space. The slide-plate $h$ leaves free underneath it a relatively narrow space through which the water flows out of the space $g$ in a broad, thin, uniform stream toward the rear flat bottom surface $i$. The partition $f$ may be fixed or may be so adjusted directly by hand or by means of a mechanism $n$ so that an opening adjusted according to the requirement of the special circumstances, joins underneath this partition the receptacles $a$ and $b$ together.

At the lowermost point of the apparatus is fixed the outlet $c^1$ and moreover, there are provided in case of need at several points of different heights, the outlet taps $c^2$, $c^3$ for the precipitating material. At a still greater height is placed an outlet $l$ for a portion of the not yet fully clarified water which can be used for filling the pulp-engines and so forth. At the edge of the container $b$ are arranged overflow spouts $e$ which discharge into the drain $m$. At the highest point of the receptacle $a$ are arranged at a few centimeters above the water level the side outlets $k$ which serve for the continuous or intermittent removal of the separated fatty and other like materials and especially of the foam. The lower edge of these outlets is placed a little above the highest water level so that here only the foam is discharged into a pit or the like. On the flowing down of the water beneath the baffle plate $h$ in a quiet, broad, and thin stream, the heavy particles are deposited upon the surface $i$. Also the particles and lumps which first rise and then, after collecting together, sink down, are precipitated upon the sloping surface $i$, after they have by coagulation lost their buoyancy. The substances deposited upon the surface $i$ are carried by the water-flow undisturbed and without any danger of escape to the outlet taps $c^1$, $c^2$, $c^3$, from which place they can be brought back again, according to need, to the paper machine, and so on. By the arrangement that beneath the partition $f$ there takes place a sharp alteration of direction with simultaneous considerably diminishing speed, the filaments, etc., still remaining in the water do not follow the current upward, but are led toward the outlet tap $c^1$ and partly toward the taps $c^2$ and $c^3$. The separation of these particles is also facilitated by the suction effect of the water flowing off through the tap $c^1$ and also through the taps $c^2$ and $c^3$. The clarified water rises gradually in the receptacle $b$ up the smooth walled surfaces and can be let off through the outlet $l$ as far as is necessary for the filling of pulp-engines or for other purposes. The thus occasioned lowering of the water level, consequently also the alteration of the quantity of material flowing back to the paper machine and so on, is in consequence of the proportion to the contents of the great surfaces of the receptacle, so small, that by the trifling alteration in the height of the water level, no unfavorable action on the working of the paper machine with regard to the weight of the paper can be produced. The water flowing over the rim $e$ can be allowed to flow off, or it may also, if necessary, be utilized for other purposes, for instance for filling the rag-boilers, suction-boxes and so on, because this water is completely free from foam. The fatty bodies, rising in the receptacle $a$, are collected there with certainty by means of the partition $f$. Neither can they come to the outflow through the taps $c^1$, $c^2$, $c^3$, nor into the clarified water flowing away above in the receptacle $b$. They pass together with the air, which is present, into the receptacle $a$ at the surface and can there be discharged through the channel $k$ or when the apparatus is emptied, they may be run into a special pit or the like. The partition $f$ can be so arranged that it can be entirely or partially withdrawn according to circumstances, whereby the device is rendered accessible in all its parts and can be easily cleaned. The cleaning can also be performed easily in a few minutes without withdrawal of the partition, by use of a hose.

In the construction of the new apparatus it has been rendered impossible by many simple means, that on one hand any valuable particles should flow off, and on the other hand, that unsuitable material and air or the like should be mixed with them or that any fibrous or serviceable particles should flow away with the clarified waste water. The mechanism can moreover be used both for continuous and also for temporary removal of concentrated fluid. When the re-using of the concentrated fluid is not in question, then by aid of this construction, a considerable concentration can be attained and thereby the quantity of the residues which have to be further treated, is considerably reduced. For periodical use the partition $f$ can be adjusted according to the height of material, which collects between two removals. The material is then deposited at the lowest point of the receptacle. The number of the outlet taps depends on the circumstances. In general, the separation of the floating particles is aided by the arrangement of several taps which can be used at the same time. The above described installation can also be altered in such a manner, that the waste water flows from beneath into the clarifying tank through a pipe widening gradually up to the entire width of the clarifying receptacle. By these means there is attained, that the formation of foam is almost entirely avoided. Water is forced in from below through the supply pipe $p$ into the inlet $d$, which gradually widens to the entire width of the receptacle, and passes from thence into the first space $g$ and then into the receptacle $a$.

Having now described the invention, what we claim is—

1. Apparatus for purifying the waste water from paper, cellulose and similar industries, comprising a front and a rear container connected at their lower parts, an adjustable sloping partition between said containers, a transverse baffle plate near the inlet of said front container, and outlets in the rear container, the lower wall of said front container being disposed at a lower angle than the lower wall of the rear container.

2. Apparatus for purifying the waste water from paper, cellulose and similar industries, comprising a front and a rear container connected together at their lower parts, an adjustable inclined partition between said containers, a transverse baffle plate near the inlet of said front container, lateral overflow channels at the upper sides of said front container, said front container having higher walls than the rear containers, and a plurality of outlets in said rear container, as specified.

3. Apparatus for purifying waste water from paper mills and similar industries, comprising a front and a rear container, connected at their lower parts, an adjustable sloping partition between said containers, a transverse baffle plate near the inlet of said front container, lateral overflow channels at the upper edges of said rear container, as herein set forth.

4. Apparatus for purifying waste water from paper mills and similar industries, comprising a front and a rear container connected at their lower parts, an adjustable sloping partition, between said containers, a transverse baffle plate near the inlet of said front container, lateral overflow channels at the upper sides of said front container, said front container having higher walls than the rear container and a plurality of valve controlled outlets at different elevations through the inclined rear end of said rear container, the lower walls of the containers and the partition wall sloping toward the deepest part of the rear container.

In testimony, whereof, we have signed our names to this specification in the presence of two subscribing witnesses.

EDUARD MANN.
JACOB HEESS.

Witnesses:
S. S. BERGH,
CH. SCHMITT.

Copies of this patent may be obtained for five cents each, by addressing the "Commissioner of Patents, Washington, D. C."